US007512985B1

(12) United States Patent
Grabarnik et al.

(10) Patent No.: US 7,512,985 B1
(45) Date of Patent: Mar. 31, 2009

(54) SYSTEM, METHOD, AND COMPUTER PROGRAM PRODUCT FOR IMPLEMENTING SEARCH-AND RETRIEVAL-COMPATIBLE DATA OBFUSCATION

(75) Inventors: Genady Grabarnik, Scarsdale, NY (US); Jonathan Lenchner, North Salem, NY (US); Laura Z. Luan, Scarsdale, NY (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/112,069

(22) Filed: Apr. 30, 2008

(51) Int. Cl.
*G06F 7/04* (2006.01)
*G06F 17/30* (2006.01)
*G06K 9/00* (2006.01)
*H03M 1/68* (2006.01)
*H04K 1/00* (2006.01)
*H04L 9/00* (2006.01)
*H04L 9/32* (2006.01)
*H04N 7/16* (2006.01)

(52) U.S. Cl. .............................. 726/26; 707/9; 707/10; 715/230

(58) Field of Classification Search .................. 726/26, 726/27; 707/9, 10; 715/230
See application file for complete search history.

(56) References Cited

U.S. PATENT DOCUMENTS 6,654,754 B1    11/2003    Knauft et al.

2003/0115481 A1*   6/2003   Baird et al. .................. 713/201
2008/0118150 A1*   5/2008   Balakrishnan et al. ...... 382/176

OTHER PUBLICATIONS

Bharat Bhargava, et al., Private and Trusted Collaborations, Department of Computer Sciences and Center for Education and Research in Information Assurance and Security (CERIAS) Purdue University, 6 pages.

* cited by examiner

*Primary Examiner*—Kambiz Zand
*Assistant Examiner*—Jason K Gee
(74) *Attorney, Agent, or Firm*—Cantor Colburn LLP

(57) ABSTRACT

A system for implementing search- and retrieval-compatible data obfuscation includes an annotator that annotates data, metadata, and relationships thereof that are privacy sensitive according to privacy policies. The system also includes an indexing server that indexes the annotated data according to the policies that specify rules for controlling access to the data. The system also includes an obfuscation server for serving user requests for data search and retrieval, and specifies data entitlement and access rights for the users by applying the privacy policies to user profiles. In response to receiving a search request from a user, the obfuscation server forwards the search terms in the request, along with a privacy level determined from a corresponding user profile and the policies, to a search engine that searches indices of a database having the privacy level in the request, and returning to the user only the results which match the search terms and the privacy level. In response to receiving a data retrieval request, the obfuscation server retrieves the requested data with annotations from the database, applies the obfuscation scheme to the annotated data according to the privacy policies and the user profile, and returns to the user the obfuscated data in compliance with the privacy policies.

3 Claims, 3 Drawing Sheets

300A

06144005:: Client calling mail size full, also said that whe replication is just starts counting
Problem description:
 Client calling mail size full, also said that whe replication is just starts counting. JOAN SMITH @ 123-456-7890 HRC hd walked client through setting up arching-default for last nodified, client said that before she called the hd she deleted lots of email, had client do the file-database-properties-back and she is now at 45mg but still when replication still hung and starts a counting client did logoff and rebooted pc. sending ticket to HLB-BCC
Resolution & Solution:
 instructed customer to sort by size in all documents to remove biggest files. Also set up archiving schedule.
Open date:: 2006-10-17

06144005:: Client calling mail size full, also said that whe replication is just starts counting
Problem description:
 Client calling mail size full, also said that whe replication is just starts counting. <marker level=n>JOAN SMITH </marker>@ <marker level=m>123-456-7890</marker> HRC hd walked client through setting up arching-default for last nodified, client said that before she called the hd she deleted lots of email, had client do the file-database-properties-back and she is now at 45mg but still when replication still hung and starts a counting client did logoff and rebooted pc. sending ticket to HLB-BCC
Resolution & Solution:
 instructed customer to sort by size in all documents to remove biggest files. Also set up archiving schedule.
Open date:: 2006-10-17

FIG. 3B

SYSTEM, METHOD, AND COMPUTER PROGRAM PRODUCT FOR IMPLEMENTING SEARCH-AND RETRIEVAL-COMPATIBLE DATA OBFUSCATION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to information security, and particularly to a system, method, and computer program product for implementing search- and retrieval-compatible data obfuscation.

2. Description of Background

Obfuscation is a widely used method for making extraction of information more difficult. In one application, obfuscation is used to make it difficult to reverse engineer programs (see, e.g., Sunil Gupta, "Code Obfuscation—Part 2: Obfuscating Data Structures," http://palisade.plynt.com/issues/2005Sep/code-obfuscation-continued/). In another application, obfuscation is used to mask data to make it less recognizable (see, e.g., "The Data Masker: Data Obfuscation Made Simple," http://www.datamasker.com/dm_sitemap.htm).

Obfuscation is also widely used in security and privacy where data obfuscation addresses this dilemma by extending several existing technologies and defining obfuscation properties that quantify the technologies' usefulness and privacy preservation (see, e.g., David Bakken, Rupa Parameswaren, Douglas Blough, Andy Franz and Ty Plamer, "Data Obfuscation: Anonymity and Desensitization of Usable Data Sets" http://doi.ieeecomputersociety.org/10.1109/MSP.2004.97; and R. Agrawal and S. Ramakrishnan, "Privacy-Preserving Data Mining," Proc. ACM SIGMOD Conf. on Management of Data, ACM Press, 2000, pp. 439-450).

Obfuscation is also used to hide actual IP addresses from being recognized by malice web sites and not allowing the sites to collect personal data from the PC every time it is visited by a user (see, e.g., NetConceal—software to hide your ip address: http://www.netconceal.com/).

One way to access documents/information in an electronic format is to create an index of some sort (e.g., using keywords or topics, etc.) and then providing a search capability, incorporating the index, in such a way that a desired document or portion thereof may be located quickly. This is described in U.S. Pat. No. 6,654,754 (issued November 2003), entitled "System and method of dynamically generating an electronic document based upon data analysis."

Existing methods of obfuscation (see, e.g., U.S. Pat. No. 6,981,217 (issued December 2005), entitled "System and method of obfuscating data") are incompatible with regular indexing, such as the indexing methods described in U.S. Pat. No. 6,654,754, and create significant difficulty for locating information in the obfuscated documents.

What is needed, therefore, is a way to obfuscate information or documents that enables the creation of indices, as well as a way to obfuscate not only content, but also metadata and the structure and relationships between artifacts.

SUMMARY OF THE INVENTION

The shortcomings of the prior art are overcome and additional advantages are provided through the provision of a system for implementing search- and retrieval-compatible data obfuscation includes an annotator that annotates data, metadata, and relationships thereof that are privacy sensitive according to privacy levels. The system also includes an indexing server that indexes the annotated data according to policies that specify rules for controlling access to the annotated data based upon the annotated privacy levels and user profiles. The system also includes an obfuscation server for defining the user profiles, which specifies data entitlement and access rights for the users. In response to receiving a search request from a user, the obfuscation server forwards the search terms in the request, along with a privacy level determined from a corresponding user profile and the policies, to a search engine that searches indices of a database having the privacy level in the request, and returning to the user only the data, metadata, and relationships which match the search term and privacy level.

Method and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which provides privacy protection and authorized data access to the documented details and structural artifacts of a service engagement involving customers and one or more service providers, each of whom have different access levels and privacy requirements. Documents/records are annotated, either automatically (for example, using rule-based expressions) or manually, and then a semantic search is employed to identify and determine the sections/fractions of the data content that are privacy sensitive and require access authorization. Once the sections/document fractions are identified and marked with appropriate markers of privacy levels, a set of policies along with user profiles are used to automatically determine the obfuscation schemes applicable to each marked section/fraction of the data content. The obfuscation schemes are applied to various aspects of the data including search indexing data, metadata, and the retrieved marked original data for rendering to end users.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3A is a diagram of a trouble ticket including sample data before annotation by the data obfuscation processes; and FIG. 3B is a diagram of the trouble ticket after annotation in accordance with an exemplary embodiment.

The detailed description explains the preferred embodiments of the invention, together with advantages and features, by way of example with reference to the drawings.

DETAILED DESCRIPTION OF THE INVENTION

In an exemplary embodiment, a system, method, and computer program product for implementing search- and retrieval-compatible data obfuscation are provided. The data obfuscation provides privacy protection and authorized data access to the documented details and structural artifacts of a service engagement involving customers and one or more service providers, each of whom has different access levels and privacy requirements. The data obfuscation processes solve this problem by obfuscating sensitive sections/fractions of the data content during indexing, search, and rendering to be compliant with application specific privacy policies and user profiles. The data obfuscation addresses the problem existing particularly in service management solutions where multi-party consumers and suppliers access and analyze common data sources for service quality and contract execution management.

Figure 1:
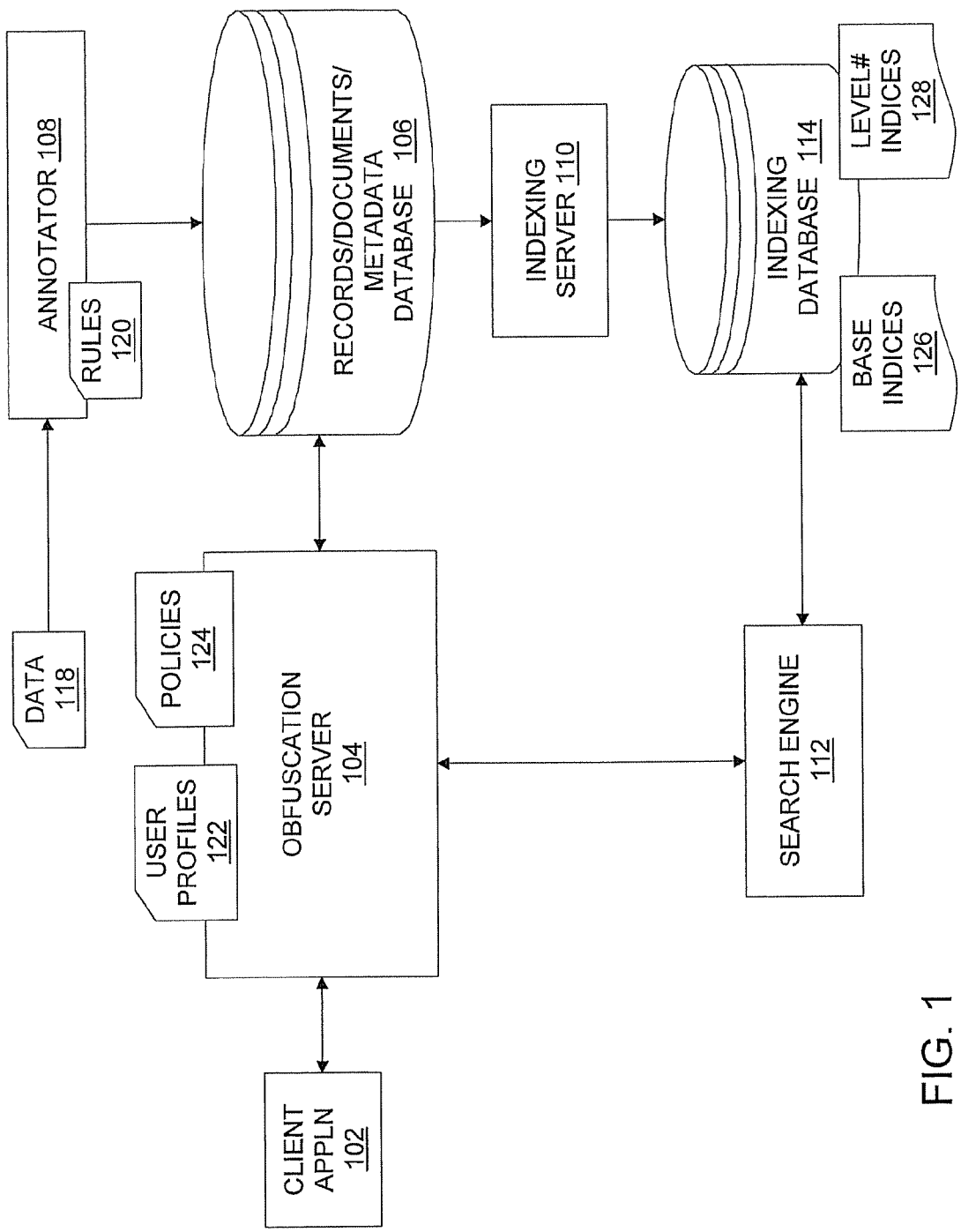
FIG. 1 is a block diagram depicting a system upon which data obfuscation may be implemented in an exemplary embodiment.

Turning now to the drawings in greater detail, it will be seen that in FIG. 1, there is a system upon which the exemplary data obfuscation processes may be implemented. Each of the components illustrated in the system of FIG. 1 may be implemented via a single computer processing system (e.g., a high-speed processor), or may be interspersed among two or more computer systems (e.g., within a LAN or client-server environment).

The system of FIG. 1 includes an annotator 108, which detects the sections/fragments of data in a document, record, or metadata (e.g., data 118) that are privacy sensitive and subject to obfuscation, and marks those data sections/fractions according to application-defined rules 120. The annotation may be applied automatically by a computer program or manually by a human being. Various tools 120, such as rule based expression and semantic search, may be used to facilitate the marking process. The rules 129 used in the annotator 108 may be data category specific. For example, problem records in a ticket system may be annotated using customer account specific rules. Sample problem tickets are shown in FIGS. 3A and 3B.

The system also includes a database 106, which stores annotated documents, records, and metadata. The database 106 may be federated, containing multiple database instances.

The system further includes an indexing server 110, which recognizes the annotation markers in the documents/records/metadata stored in database 106 and produces indexing data accordingly in various privacy levels. The base level indexing data are produced from the data without any markers and hence have the least privacy protection.

Also included in the system of FIG. 1 is an index database 114, which stores base level indices 126 and additional indices 128 for each higher privacy level produced by the indexing server 110.

In addition, an obfuscation server 104 is provided in FIG. 1, which processes user requests (e.g., a request to retrieve a document or a request to search the database 106 via, e.g., a client application 102) and executes data obfuscation according to system policies 124 and user profiles 122.

A search engine 112 is provided for producing relevant document/record/metadata links for given search terms and the privacy level.

A user is associated with a profile 122, which defines his/her data entitlement and access rights. The privacy policy 124, together with a given user profile 122, determines the obfuscation level and applicable obfuscation targets for a user request.

Figure 2:
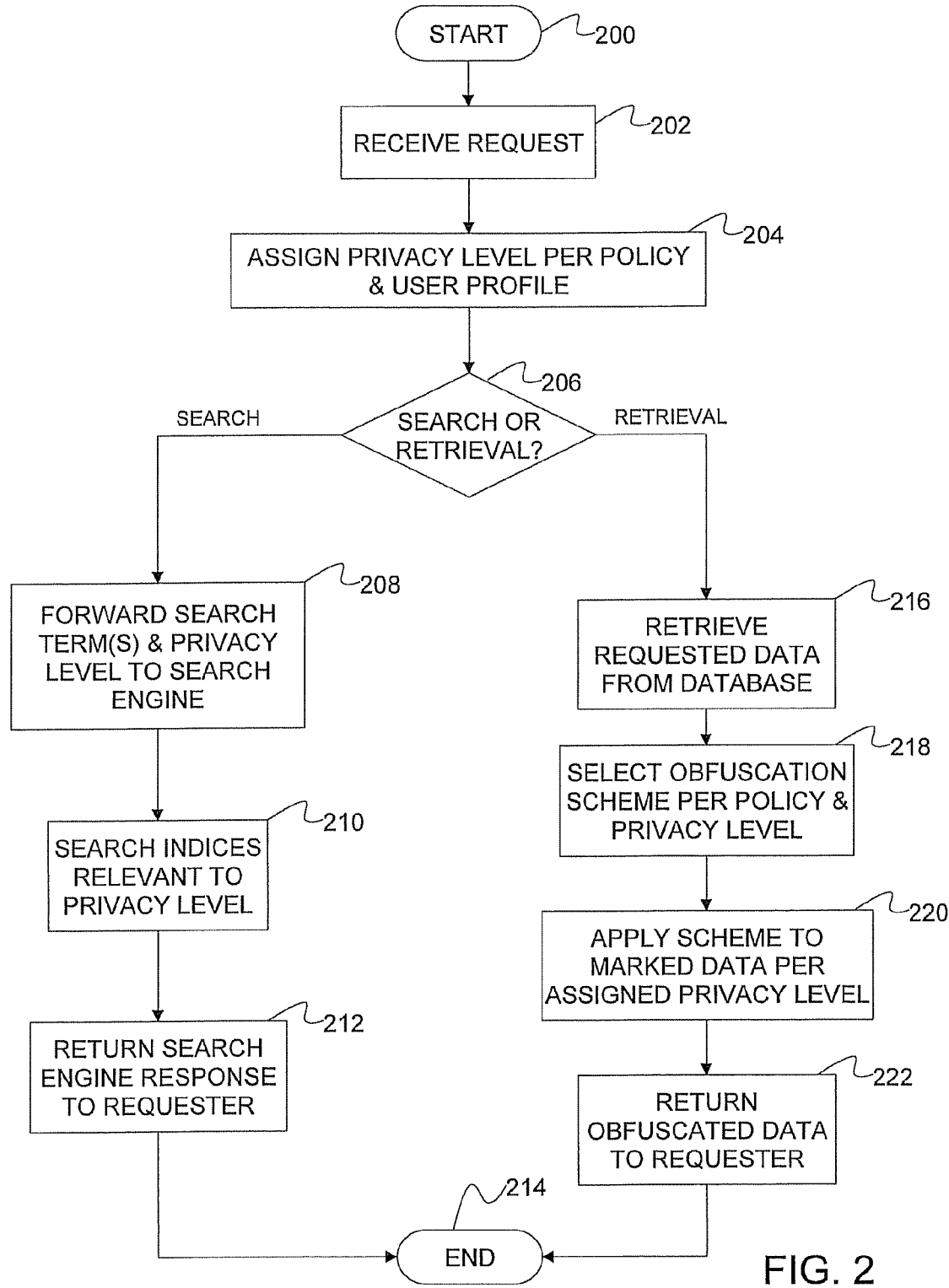
FIG. 2 is a flow diagram describing a process for implementing data obfuscation in an exemplary embodiment.

Turning now to FIG. 2, a flow diagram describing a process for implementing the data obfuscation processes will now be described in an exemplary embodiment. The exemplary data obfuscation processes provide data privacy protection by applying obfuscation both in data rendering for presentation and in data indexing for search. Obfuscation in data rendering is illustrated in steps 200-212 and obfuscation in search indexing is illustrated in steps 200-206 and 216-222.

The process begins at step 200 whereby the obfuscation server 104 receives a request at step 202. The obfuscation server 104 assigns a privacy level to the request according to policies 124 and the profile 122 of the user who initiated the request at step 204. At step 206, it is determined whether the request is for a search or a document retrieval.

If the request is for a search, the process proceeds to step 208 whereby the obfuscation server 104 forwards the search term(s) (in the request), along with the privacy level assigned to the search engine 112. The search engine 112, in turn, searches the indices (e.g., one or both of indices 126/128) based upon the privacy level at step 210. At step 212, the search response is returned to the requester by the search engine 112. The content of the response varies according to the privacy level assigned. Example obfuscation schemes and scenarios illustrating this concept are provided further herein.

If, however, the request is for retrieval of a document, i.e., a piece of data, metadata, or relationship data at step 206, the process proceeds to step 216, whereby the obfuscation server 104 retrieves the requested data/document from the database 106. The obfuscation server 104 selects the obfuscation scheme according to the policy 124 and the assigned privacy level at step 218. In step 220, the obfuscation server 104 applies the selected scheme to the annotated data in the retrieved document according to the privacy level and returns the obfuscated data (e.g., document, record, metadata, etc.) to the requester at step 222. The process ends at step 214. The data obfuscation may employ various techniques such as simple black-out, simple substitution cipher, or anonymity/pseudonymity A linear obfuscation scheme is demonstrated below for the scenario of searching/viewing problem tickets. FIG. 3A a sample problem ticket record 300A (e.g., data 118 of FIG. 1), and FIG. 3B shows the sample problem ticket 300B marked up with privacy levels by the annotator 108.

Scheme:

Substitute the marked data of level>n with blanks or a randomized string for a user of privacy level=n.

<marker level=n>, n=0, 1,. . .

where level=0 has no privacy protection, same as if no markers;

level=n and n>0 has more privacy protection than level=n–1.

Annotator marking rules (examples):

Level=1, if a company name

Level=2, if a person's name, a non 800/888/877/866 phone number

Level=3, if an IP address

User Profiles (examples):

Role=subcontractor
Role=customer
Role=administrator
Policies to assign user privacy levels (examples):
If role=subcontractor, then level=1,
If role=customer, level=2,
If role=administrator, then level=3

The base indices 126 for search are produced and stored in index database 114. The base indices 126 are those produced from the data (indexed from database 106) with no markers (i.e., marker level=0). Additional indices 128 for level=n, n>1 are generated from the data (indexed from database 106) with marker level=n.

A search request from a user (e.g., via client application 102) with a role of "subcontractor" is assigned "level=1" by obfuscation server 104 using the user profile 122 and the policy 124. The search request and the assigned privacy level are forwarded to search engine 112 which searches the relevant records among the base indices 126 and the additional indices 128 of level=1. If the search term is a person's name or a non-800 phone number, for instance, the search engine 112 will not return any results for the names and the phone numbers are not included in the indices to which the request is entitled.

If a search request is from a user with the "customer" role, it is assigned a privacy level=2 and, therefore, entitled to the additional indices of levels 1 and 2 (e.g., indices 128). The search engine 112 will return results if any matches are found in these indices.

In the case of a retrieval request, if from a user with the "subcontractor" role, it will be assigned with privacy level=1. The obfuscation server 104 will obfuscate the marked record from the database 106 where the markers are level>1 and return to the user the obfuscated record with the personal names, phone numbers, and IP address eradicated.

If a retrieval request is from a user of "customer" role, the returned obfuscated record will have only IP addresses eradicated.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for implementing search- and retrieval-compatible data obfuscation, comprising:

an annotator for identifying sections or fractions in the data, metadata, and relationships that are privacy sensitive, the annotator annotating the identified sections or fractions according to application-specific rules, the application-specific rules including privacy levels ranging from a lowest level of least sensitive to a highest level of most sensitive;

a first database in communication with the annotator for storing annotated data, metadata, and relationships;

an indexing server in communication with the first database, the indexing server indexing the annotated data, metadata, and relationships according to privacy policies, the privacy policies specifying rules for permitting and restricting access to the annotated data, metadata, and relationships based upon the annotated privacy levels and user profiles;

a second database in communication with the indexing server for storing the indices of the data, metadata, and relationships, in a second database according to annotated privacy levels; and an obfuscation server in communication with the second database, via a search engine, and the first database, the obfuscation server defining the user profiles and privacy policies for users of the first and second databases, the user profiles together with the privacy policies specifying data entitlement and access rights for each of the users;

wherein, in response to receiving a search request from a user the obfuscation server forwards the search terms in the request, along with a privacy level determined from a user profile of the user and the privacy policies, to a search engine, the search engine searching indices of the second database having the privacy level in the request, and returning to the user only the links to the data, metadata, and relationships which match the search term and the privacy level.

2. The system of claim 1, wherein, in response to receiving a request from the user for a document of data, metadata, and relationships, the obfuscation server retrieves the requested document from the first database, selects an obfuscation technique according to the privacy policies and the user profile, applies the selected obfuscation technique to the annotated sections/fractions in the requested document according to the privacy level, and returns the obfuscated document to the user.

3. The system of claim 1, wherein the obfuscation technique is implemented as one of:
data blackout;
substitution cipher; and
anonymity/pseudonymity.

* * * * *